United States Patent
Kronhaus

(10) Patent No.: US 9,334,068 B2
(45) Date of Patent: May 10, 2016

(54) UNIFIED ORBIT AND ATTITUDE CONTROL FOR NANOSATELLITES USING PULSED ABLATIVE THRUSTERS

(71) Applicants: NOA, Inc., Miami Beach, FL (US); Igal Kronhaus, Miami Beach, FL (US)

(72) Inventor: Igal Kronhaus, Würzburg (DE)

(73) Assignees: NOA Inc., Miami Beach, FL (US); Igal Kronhaus, Wuerzburg (DE)

( * ) Notice: Subject to any disclaimer, the term of this patent is extended or adjusted under 35 U.S.C. 154(b) by 112 days.

(21) Appl. No.: 14/245,695

(22) Filed: Apr. 4, 2014

(65) Prior Publication Data

US 2015/0284112 A1 Oct. 8, 2015

(51) Int. Cl.
*G01C 21/24* (2006.01)
*B64G 1/26* (2006.01)
*B64G 1/10* (2006.01)
*B64G 1/24* (2006.01)

(52) U.S. Cl.
CPC .. *B64G 1/26* (2013.01); *B64G 1/10* (2013.01); *B64G 1/242* (2013.01); *B64G 2001/245* (2013.01)

(58) Field of Classification Search
None
See application file for complete search history.

(56) References Cited

U.S. PATENT DOCUMENTS

| | | | | |
|---|---|---|---|---|
| 3,866,025 A | * | 2/1975 | Cavanagh | B64G 1/26 244/169 |
| 4,537,375 A | * | 8/1985 | Chan | G05D 1/0883 244/164 |
| 5,130,931 A | * | 7/1992 | Paluszek | G05D 1/0883 244/164 |
| 5,140,525 A | * | 8/1992 | Shankar | G05D 1/0883 244/164 |
| 5,199,672 A | * | 4/1993 | King | B64G 1/007 244/164 |
| 5,279,483 A | * | 1/1994 | Blancke | B64G 1/24 244/165 |
| 5,337,981 A | * | 8/1994 | Bender | B64G 1/24 244/164 |
| 5,400,033 A | * | 3/1995 | Hablani | B64G 1/24 342/358 |
| 5,452,869 A | * | 9/1995 | Basuthakur | B64G 1/24 244/164 |

(Continued)

FOREIGN PATENT DOCUMENTS

| | | |
|---|---|---|
| CN | 101539127 B | 5/2011 |
| CN | 102116277 B | 12/2012 |
| CN | 103303494 A | 9/2013 |

OTHER PUBLICATIONS

Ruggiero, A. et al., "Low-Thrust Maneuvers for the Efficient Correction of Orbital Elements," 32nd International Electric Propulsion Conference (IEPC), Wiesbaden, Germany, Sep. 11-15, 2011, pp. 1-13.

(Continued)

*Primary Examiner* — Medhat Badawi
(74) *Attorney, Agent, or Firm* — Talem IP Law, LLP

(57) ABSTRACT

Systems and methods for orbit and attitude control of nanosatellites are provided. A spacecraft can be equipped with a plurality of pulsed ablative thrusters (PAT), mounted on at least one of the spacecraft body orientations. The PATs are integrated with the spacecraft structure. The actual spacecraft attitude is measured by a sensor and compared with the desired thrust direction. In order to reduce attitude errors, a control system is used to determine the firing sequence of thrusters. During maneuvering the thrusters are continuously being fired. To conserve energy a thrust switch control is utilized, selecting a single PAT to be fired each pulse. The result of this operation is that the attitude of the spacecraft is adjusted continuously. Therefore, thrust deviation from a selected path can be minimized during orbital maneuvering.

19 Claims, 3 Drawing Sheets

(56) References Cited

U.S. PATENT DOCUMENTS

| | | | | |
|---|---|---|---|---|
| 5,458,300 | A * | 10/1995 | Flament | B64G 1/24 244/169 |
| 5,610,820 | A * | 3/1997 | Shankar | B64G 1/24 244/164 |
| 5,646,847 | A * | 7/1997 | Ratan | B64G 1/24 244/164 |
| 6,032,903 | A * | 3/2000 | Fowell | B64G 1/24 244/164 |
| 6,131,385 | A | 10/2000 | Lewis, Jr. et al. | |
| 6,347,262 | B1 * | 2/2002 | Smay | B64G 1/281 244/164 |
| 6,441,776 | B1 * | 8/2002 | Hein | B64G 1/24 244/164 |
| 6,471,161 | B1 * | 10/2002 | D'Ambrosio | B64G 1/32 244/164 |
| 6,487,844 | B1 * | 12/2002 | Lohn | F02K 9/88 60/200.1 |
| 6,504,502 | B1 * | 1/2003 | Wu | B64G 1/24 342/354 |
| 6,530,212 | B1 | 3/2003 | Phipps et al. | |
| 2002/0023427 | A1 * | 2/2002 | Mojarradi | F03H 1/0012 60/203.1 |
| 2003/0164429 | A1 * | 9/2003 | McGovern | B64G 1/285 244/171 |
| 2005/0133671 | A1 * | 6/2005 | Wang | G05D 1/0883 244/170 |
| 2006/0186274 | A1 * | 8/2006 | Wang | B64G 1/281 244/158.4 |
| 2007/0023579 | A1 * | 2/2007 | Wang | G05D 1/0883 244/158.6 |
| 2007/0080858 | A1 * | 4/2007 | O'Brien | B64G 1/24 342/358 |
| 2008/0197238 | A1 | 8/2008 | Bae | |
| 2008/0265098 | A1 * | 10/2008 | Connelly | B64G 1/007 244/158.1 |
| 2009/0108138 | A1 * | 4/2009 | Mintz | B64G 1/64 244/173.3 |
| 2009/0139206 | A1 * | 6/2009 | Spanjers | F02K 9/08 606/256 |
| 2009/0153015 | A1 * | 6/2009 | King | F03H 1/00 313/359.1 |
| 2009/0217642 | A1 * | 9/2009 | Fuller | F02K 9/10 60/251 |
| 2010/0058734 | A1 * | 3/2010 | Stein | F03H 1/0093 60/203.1 |
| 2011/0240801 | A1 * | 10/2011 | Manzoni | B64G 1/1021 244/171.1 |
| 2011/0274134 | A1 * | 11/2011 | Rubenchik | B64G 1/409 372/79 |
| 2012/0097796 | A1 * | 4/2012 | Munir | B64G 1/007 244/158.6 |
| 2012/0199697 | A1 * | 8/2012 | Nagabhushan | B64G 1/286 244/165 |
| 2012/0304618 | A1 * | 12/2012 | Roy | B64G 1/405 60/203.1 |
| 2012/0318886 | A1 | 12/2012 | Manzoni | |
| 2014/0061386 | A1 * | 3/2014 | Peterka, III | B64G 1/002 244/171.5 |
| 2015/0217876 | A1 * | 8/2015 | Halsband | B64G 1/10 244/172.6 |

OTHER PUBLICATIONS

Markusic, T., et al., "Ablative Z-Pinch Pulsed Plasma Thruster," Journal of Propulsion and Power, vol. 21, No. 3, May-Jun. 2005, pp. 392-400.

* cited by examiner

UNIFIED ORBIT AND ATTITUDE CONTROL FOR NANOSATELLITES USING PULSED ABLATIVE THRUSTERS

TECHNICAL FIELD

The present disclosure relates generally to systems and methods of spacecraft orbit and attitude control, and, more particularly, to nanosatellites with pulsed ablative thrusters where the spacecraft is required to control its attitude and orbit within long durations of low thrust maneuvers.

BACKGROUND

Nanosatellites are satellites with masses of less than about 10 kg. Although sometimes referred to as picosatellites, in this disclosure, satellites with masses between 0.1 to about 1 kg are also included in the nanosatellites family. Nanosatellites are gaining popularity for use in applications including remote sensing, communication, and space research, in part because of the relatively low cost of nanosatellites as compared to the larger satellites.

A single satellite in low Earth orbit (LEO) has a time-limited line of sight with a ground location. Consequently there may be large gaps in coverage until the ground track repeats. However, a network of satellites can maintain a near constant radio and visual coverage or simultaneously provide coverage of multiple regions.

One advantage of using low-cost nanosatellites is the ability to launch numerous platforms for a similar cost as launching a larger satellite. Thus, a network of low-cost nanosatellites can be launched and used to maintain high temporal resolution sensing. In this manner, nanosatellites can form the space segment of a communications network or an Earth observation sensor network.

At a minimum, in order to maintain the network integrity, the satellites need to keep a line of sight with each other. Due to gravitational and drag perturbations in LEO, such a formation-flying configuration cannot be maintained for more than few weeks without orbital correction maneuvers. The need for orbital correction maneuvers may arise in spite of the fact that the satellites are often deployed from a common launcher.

BRIEF SUMMARY

A unified attitude-and-orbit control is provided for nanosatellites. According to certain implementations, a nanosatellite is constructed to include a plurality of pulsed ablative thrusters (PATs) on at least one of the spacecraft body orientations, an attitude sensor, and a processing system performing calculations and generating control signals for activating the PATs.

The spacecraft body of the nanosatellite can be configured so that the PATs appear embedded within the spacecraft body extremities (e.g., edges of a common cube-shaped spacecraft body), enabling the original shape of the spacecraft body to be maintained and saving mass and internal volume. Control electronics of the processing system and other sensors may be incorporated in or on the spacecraft body as suitable for the conditions in which the satellite is operated.

According to an embodiment of the unified attitude and orbit control, the attitude sensor signal is compared by the processing system of the spacecraft to a desired spacecraft attitude, calculated by the processing system based on orbit position and predicted trajectory. The comparison generates an error signal used to calculated a corrective torque, which is evaluated by the processing system to determine a single thruster of the PAT assembly which is to be operated at full thrust at any given time or pulse. Advantageously, the full utilization of the pulsed nature of the PATs can be carried out, where the actuation is performed in discrete unit or pulses. Thus, the maximum amount of energy is available to power the thruster, affecting positively on its performance.

These and other features, aspects, and embodiments of the present invention will become better understood with regard to the following description, appended claims, and accompanying drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
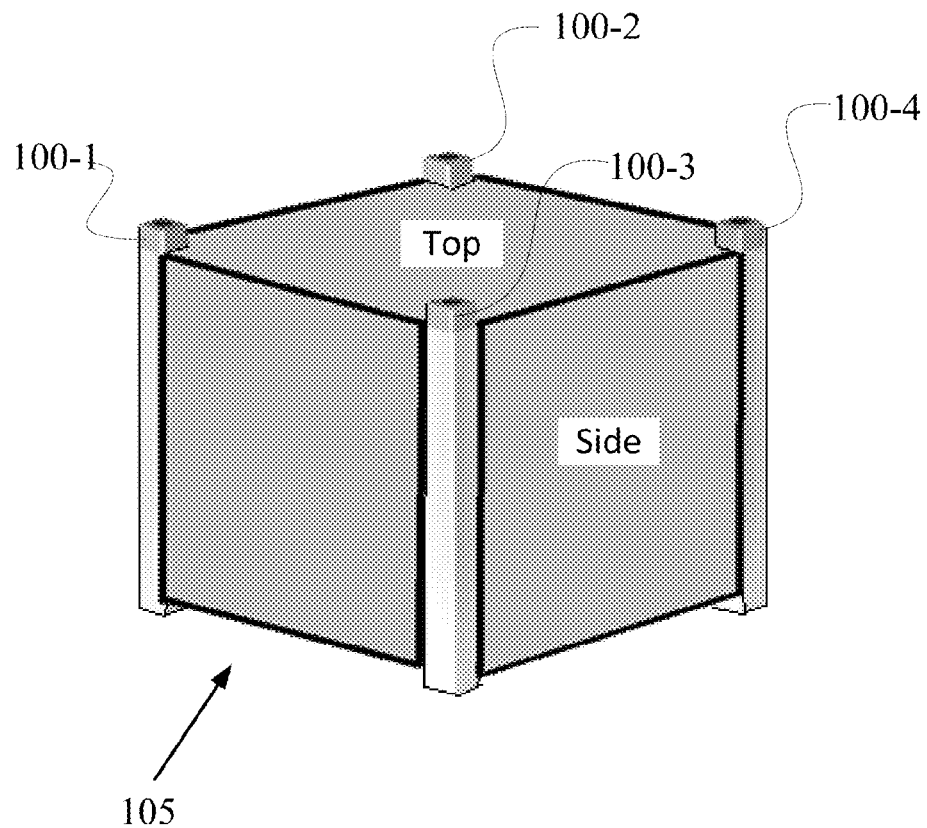
FIG. 1 shows an example cubic nanosatellite configuration with four thrusters mounted on the frame of the spacecraft (top orientation) and showing side panels being free to other uses.

A pulsed ablative thruster (PAT)-based combined, or "unified", orbit-and-attitude control system is provided. In certain implementations, the unified orbit-and-attitude control system for PAT-based propulsion systems may avoid the power, mass, and volume penalties of having an attitude control system (e. g. momentum wheels) separate from the propulsion system. In addition, some of the described configurations facilitate efficient use of power (and fuel).

Orbital correction maneuvers are carried out by satellites to keep a line of sight with each other and maintain a formation-flying configuration for more than a few weeks.

For nanosatellites, with total mass of less than few kilograms, executing the required orbital velocity change $\Delta V$ (10-100 m/s) using conventional chemical propulsion can be impractical, as the propulsion system occupies a large fraction of the available volume and mass. Instead, PATs such as pulsed plasma thrusters or vacuum arc thrusters can be used. These belong to the type of propulsion known as electric propulsion (EP) where electrical energy is converted to thrust power. PATs have low mass and volume by the fact of their high specific impulse (exhaust velocity divided by the acceleration of gravity), Isp>300 s, and their use of solid propellants. However, due to the limited availability of electrical power on board the nanosatellite, the PATs are able to generate only low thrust, therefore long duration maneuvers are required. As a consequence, a continuous and precise thrust-vector-control must be kept during the maneuver. The described unified orbit-and-attitude control system enables the thrusters to constantly operate while the average thrust direction can be controlled to reduce the satellite's deviation from a desired orbital acceleration direction.

The spacecraft orbit-and-attitude control system and methods are described herein for use in low earth orbit (LEO) satellites. However, the spacecraft control system and methods are not limited thereto and can include medium earth orbit (MEO) and geosynchronous earth orbit (GEO) satellites.

Formation flying, station keeping, and orbit change maneuvers can also be carried out by the described orbit-and-attitude system. A variety of orbit determination techniques and thrust levels can also be implemented.

The described arrangements and techniques are suitable for very small platforms, including nanosatellites of the picosatellites variety. According to embodiments of the invention, a nanosatellite is constructed to include a plurality of PATs located on at least one of the spacecraft body orientations. In certain implementations, the thrusters are mounted on the spacecraft extremities, where part of the structure is replaced by a thruster assembly. In this manner, the PATs are implemented as part of the spacecraft structure, thus saving mass and internal volume (as well as external surface area for other applications). Furthermore, this arrangement provides the highest control torque per thrust ratio, assuming the center of mass is near the geometric center of the spacecraft.

An example of this configuration is shown in FIG. 1, where four PATs 100-1, 100-2, 100-3 and 100-4 are shown at the edges of a cubic-shaped frame 105 of a spacecraft. A portion of the frame 105 is cut away to allow for the PATs (100-1, 100-2, 100-3 and 100-4) to be fixed at the edges. In this example configuration, the four thrusters are arranged at the edges of the spacecraft frame with a top orientation. This configuration leaves the side panels free for other uses.

Figure 2:
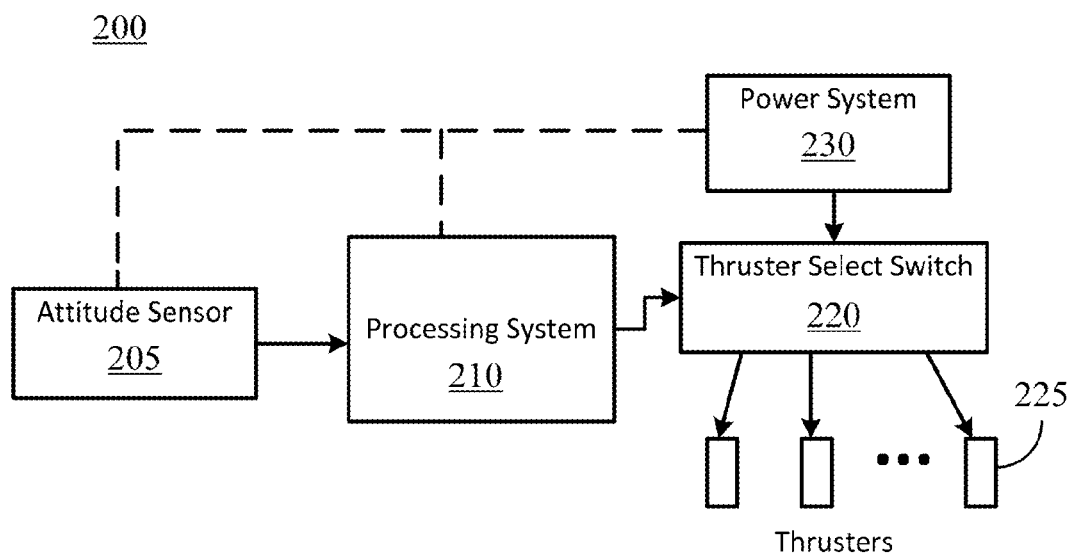
FIG. 2 shows a block diagram illustrating a spacecraft with a thruster based attitude control system.

In addition to a plurality of PATs, a spacecraft according to certain embodiments of the invention includes an attitude sensor and a processing system. FIG. 2 shows a block diagram illustrating a spacecraft with a thruster-based attitude control system.

Referring to FIG. 2, a spacecraft 200 can include an attitude sensor 205 that generates an actual attitude signal, and a processing system 210 that executes orbit and attitude control for operating a thruster select switch 220 that selectively connects a thruster to a power system 230 of the spacecraft 200. In some cases, only a single thruster is connected to the power system 230 during a discrete period of time or pulse, enabling higher input power to the thruster and improved thruster performance.

Figure 3:
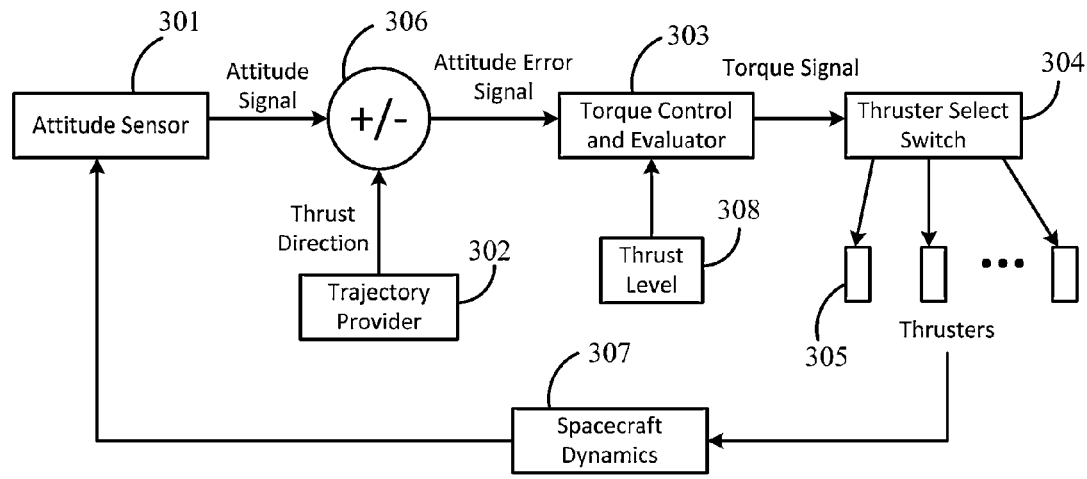
FIG. 3 illustrates a functional diagram of an example spacecraft with an orbit and attitude control system.

FIG. 3 illustrates a functional diagram of an example spacecraft with an orbit and attitude control system. Referring to FIG. 3, an orbit and attitude control system can include an actual spacecraft attitude sensor 301, a desired spacecraft trajectory provider 302, a torque control and evaluator 303, a thruster select switch 304, and PATs 305. During a low thrust maneuver, the trajectory provider 302 calculates the orbit of a spacecraft, which is the path followed by the spacecraft as it revolves around the earth, and then determines the instantaneous desirable thrust direction. The trajectory provider 302 may generate the desired thrust direction signal as a function of spacecraft orbital position, velocity, and preplanned orbit.

A comparator 306 compares the actual position signal from the attitude sensor 301 (which is determined from spacecraft dynamics 307) and the desired attitude signal (from the thrust direction) from the trajectory provider 302 to generate an attitude error signal. The attitude error signal is indicative of the difference in the spacecraft attitude between the actual attitude and the desired attitude of the spacecraft. The torque control and evaluator 303 uses the attitude error signal and the known PAT thrust level 308 (and the corresponding torque level) to calculate the control torque that minimizes the attitude error. The control torque is used to generate a torque signal that is used by the thruster select switch 304 to activate one of the PATs 305.

Through taking the attitude of the spacecraft and desired trajectory under consideration when firing the PATs, the attitude of the spacecraft can be controlled in two or three axes without additional momentum wheels or other dedicated momentum control devices, which can save power, mass or volume generally associated with the additional components.

Moreover, the propulsion system lifetime may be increased beyond that of a single PAT by distributing the firing of the thrusters over multiple thrusters.

Figure 4A:
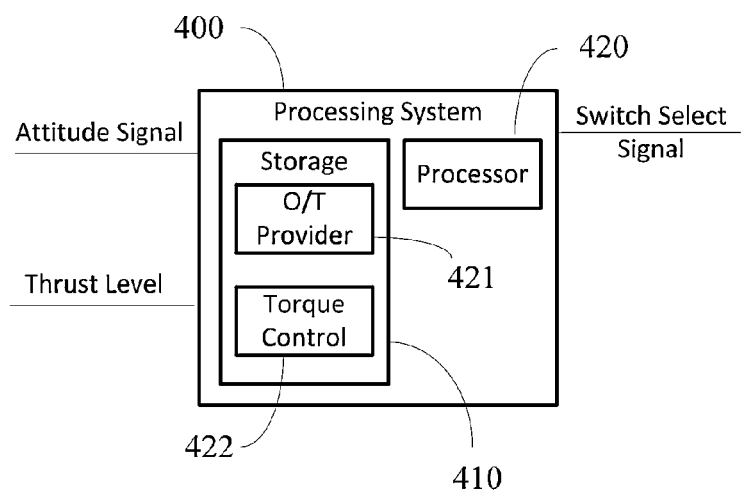
FIGS. 4A and 4B illustrate example processing system configurations.
Figure 4B:
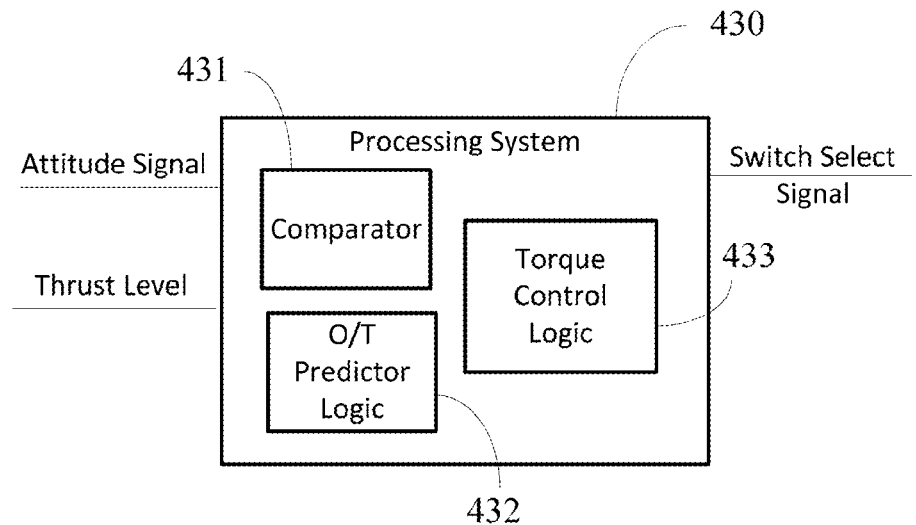

FIGS. 4A and 4B illustrate example processing system configurations. As shown in FIG. 4A, a processing system 400 can include storage media 410 and a processor 420. The processing system 400 can take an attitude signal (e.g., from the attitude sensor) and thrust level as inputs and perform calculations and comparisons using software or code stored in the storage media/medium 410 and executed by the processor 420 to generate a switch select signal. In some cases a thruster select switch is incorporated as part of the processing system.

The processor 420 may include a general purpose central processing unit, an application specific processor, logic devices, or any other type of processing device, combinations, or variations thereof.

The storage media 410 may be any suitable storage media that can store programs executable by the processor. The storage media 410 may include volatile and nonvolatile, removable and non-removable media implemented in any method or technology for storage of information, such as computer readable instructions, data structures, program modules, or other data. In some cases, the storage media includes system memory of the processor (e.g., a microprocessor or system-on-a-chip). Examples of storage media include random access memory (RAM, DRAM, SRAM), read only memory (ROM, PROM, EPROM, EEPROM), magnetic disks, optical disks, CDs, DVDs, flash memory, magnetic cassettes, magnetic tape, magnetic disk storage or other magnetic and ferromagnetic/ferroelectric storage devices, or any other suitable storage media. Certain implementations may involve either or both virtual memory and non-virtual memory. In no case is the storage media a propagated signal. In some implementations, communication media may be included over which software may be communicated internally or externally.

An orbit/trajectory (O/T) provider program 421 and a torque control program 422 may be stored as code or other form of machine-readable processing instructions on the storage media and used to carry out the techniques described herein. A comparison program (not shown) may be included and/or a hardware comparator circuit (not shown) may be included in the processing system.

As shown in FIG. 4B, the processing system 430 may be implemented in hardware (e.g., programmable logic). The processing system 430 can include a comparator 431, orbit/trajectory provider 432, and torque control 433. A thruster select switch (not shown) may also be considered part of the processing system in some implementations.

It should be understood that implementations of the described processing system may also involve a combination of software and hardware/logic solutions and that FIGS. 4A and 4B are merely provided as examples.

Figure 5:
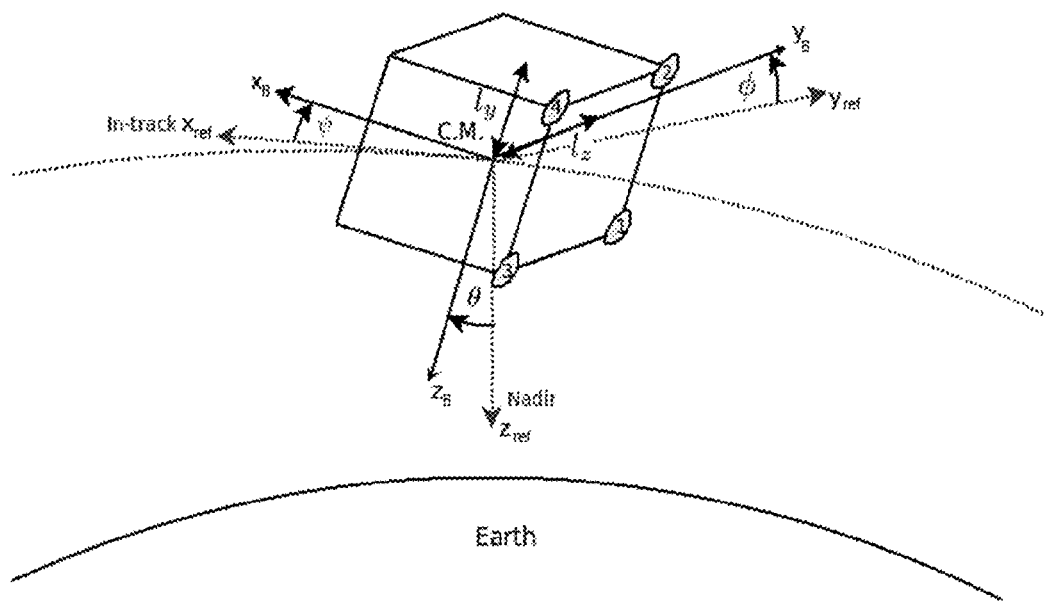
FIG. 5 illustrates a body frame (indexed as B), reference frame, and Euler angles orientations for an example implementation of a spacecraft. The figure illustrates an example for orienting the PATs.

FIG. 5 illustrates a body frame (indexed as B), reference frame, and Euler angles orientations for an example implementation of a spacecraft. The attitude of a spacecraft is the angular orientation of the spacecraft with respect to a frame of reference such as the earth or fixed stars.

Referring to FIG. 5, the attitude of the spacecraft can be understood as the body fixed reference frame pointing with respect to the orbit reference frame. The attitude dynamics can be given by:

$$[I]\dot{\omega}_{BI} + \omega_{BI} \times [I]\omega_{BI} = T_c + T_d,$$

where [I] is the spacecraft inertial tensor, $\omega_{BI}$ is the body frame angular velocity relative to the inertial frame, $T_c$ is the control torque, and $T_d$ is the disturbance torque.

Here, the thrust vector is to be oriented along the in-track direction and the thrusters are arranged at the extremities of the spacecraft on one of the spacecraft's body orientations. By arranging the PATs (labeled as 1, 2, 3, and 4 in FIG. 5) on one of the spacecraft's body orientations, given that the center of mass (C.M.) is in the geometrical center, maximum torque control is available.

The calculation for the control torque $T_c$ (in each direction x, y, and z) may be as follows for a two axis control (assuming that the spacecraft is free to rotate around the thrust axis in this case):

$$\hat{T}_{ex} = 0$$

$$\hat{T}_{ey} = -\text{sign}\left(-2q_{e2}q_{e4} + \left|\frac{\omega_{ref,y}}{2[\hat{I}]_{yy}^{-1}T_{e,max}}\right|\omega_{ref,y}\right)$$

$$\hat{T}_{ez} = -\text{sign}\left(-2q_{e3}q_{e4} + \left|\frac{\omega_{ref,x}}{2[\hat{I}]_{zz}^{-1}T_{e,max}}\right|\omega_{ref,z}\right),$$

where $\omega_{ref}$ is the reference frame angular velocity in body frame; $T_{c,max}$ is the PAT torque, known from either measurement or calculated from known thrust level and orientation with respect to the C.M.; $q_e$ is the error quaternion between the instantaneous $q_s$ and the target $q_t$ quaternions:

$$q_e = q_s^{-1} q_t = \begin{pmatrix} q_{t4} & q_{t3} & -q_{t2} & q_{t1} \\ -q_{t3} & q_{t4} & q_{t1} & q_{t2} \\ q_{t2} & -q_{t1} & q_{t4} & q_{t3} \\ -q_{t1} & -q_{t2} & -q_{t3} & q_{t4} \end{pmatrix} \begin{pmatrix} -q_{s1} \\ -q_{s2} \\ -q_{s3} \\ q_{s4} \end{pmatrix}.$$

In the above implementation, a two axis control is provided; however other implementations may include control over the rotation in the thrust direction.

Where four PATs are arranged on one of the spacecraft's body orientations (such as shown in FIGS. 1 and 5), the thruster switch control can be evaluated from the torque sign according to:

if $\hat{T}_{cy} \geq 0$ and $\hat{T}_{cz} \geq 0$ then $\hat{T}_c = [0,0,1,0]^T$ if $\hat{T}_{cy} \geq 0$ and $\hat{T}_{cz} < 0$ then $\hat{T}_c = [1,0,0,0]^T$ if $\hat{T}_{cy} < 0$ and $\hat{T}_{cz} \geq 0$ then $\hat{T}_c = [0,0,0,1]^T$ if $\hat{T}_{cy} < 0$ and $\hat{T}_{cz} < 0$ then $\hat{T}_c = [0,1,0,0]^T$.

As described herein, a spacecraft includes an attitude sensor that generates an actual attitude signal. An orbit position and trajectory predication system provides the required thrust vector direction. Because the thrusters are body fixed, the required thrust vector can determine the desired spacecraft attitude. An error signal, between actual and desired attitudes, can be calculated and used to generate a corrective torque command. The direction of the corrective torque command can be evaluated and used to select a single thruster, at any given time or pulse, to be operated at full thrust.

The integration and unification of the orbit-control and attitude-control functions may save power, mass, and volume that can be utilized by the payload. The spacecraft's available power can be efficiently utilized for orbit control, namely to power the PATs in the desired direction.

Advantageously it is possible to fully utilize the pulsed nature of the PATs, where the actuation is performed in discrete unit or pulses. Thus the maximum amount of energy is available to power the thruster, affecting positively on its performance. By distributing the firing over several thrusters the propulsion system lifetime may also be improved.

Furthermore, implementations with the PATs arranged on the extremities of the spacecraft can reduce the contamination of spacecraft surfaces by the thrusters' plasma plume (as the thrusters are located away from these surfaces).

While the present invention has been described in connection with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A spacecraft comprising:
a body structure with a plurality of pulsed ablative thrusters mounted on at least one spacecraft body orientation and integrated with a frame of the body structure;
an attitude sensor, and
a processing system, wherein in response to receiving an attitude signal from the attitude sensor, the processing system calculates an attitude error signal from the attitude signal and a desired attitude, calculates a control torque that minimizes the attitude error signal, and selects one of the pulsed ablative thrusters for activation based at least in part on the control torque,
wherein the control torque is calculated using the attitude error signal, a thrust level, and a corresponding torque level of the plurality of pulsed ablative thrusters, wherein the control torque comprises an x-axis control torque component $\hat{T}_{cx}$, a y-axis control torque component $\hat{T}_{cy}$, and a z-axis control torque component $\hat{T}_{cz}$ calculated as $$\hat{T}_{ex} = 0$$

$$\hat{T}_{ey} = -\text{sign}\left(-2q_{e2}q_{e4} + \left|\frac{\omega_{ref,y}}{2[\hat{I}]_{yy}^{-1}T_{e,max}}\right|\omega_{ref,y}\right)$$

$$\hat{T}_{ez} = -\text{sign}\left(-2q_{e3}q_{e4} + \left|\frac{\omega_{ref,x}}{2[\hat{I}]_{zz}^{-1}T_{e,max}}\right|\omega_{ref,z}\right),$$

where $\omega_{ref}$ is a reference frame angular velocity in a body frame of the body structure, $T_{c,max}$ is the corresponding torque level generated by the pulsed ablative thruster, [I] is a spacecraft inertial tensor, x, y, and z represent directional axes of the control torque, and $q_e$ is an error quaternion for the attitude error value between an instantaneous quaternion $q_s$ of the attitude signal and a target quaternion $q_t$ of the desired attitude given as:

$$q_e = q_s^{-1} q_t = \begin{pmatrix} q_{t4} & q_{t3} & -q_{t2} & q_{t1} \\ -q_{t3} & q_{t4} & q_{t1} & q_{t2} \\ q_{t2} & -q_{t1} & q_{t4} & q_{t3} \\ -q_{t1} & -q_{t2} & -q_{t3} & q_{t4} \end{pmatrix} \begin{pmatrix} -q_{s1} \\ -q_{s2} \\ -q_{s3} \\ q_{s4} \end{pmatrix}.$$

2. The spacecraft of claim 1, wherein the one of the pulsed ablative thrusters is activated at full thrust.

3. The spacecraft of claim 1, wherein the pulsed ablative thrusters comprise a pulsed plasma thruster.

4. The spacecraft of claim 1, wherein the pulsed ablative thrusters comprise a vacuum arc thruster.

5. The spacecraft of claim 1, wherein the body structure has a cubic shape, the pulsed ablative thrusters being located at two or more edges of the cubic shape.

6. The spacecraft of claim 1, wherein the processing system selects the pulsed ablative thrusters one at a time to control the attitude of the spacecraft and provide momentum management of two or three axes.

7. The spacecraft of claim 6, wherein the processing system further constantly operates the pulsed ablative thrusters to maintain an average thrust direction that reduces deviation from a desired orbital acceleration direction.

8. The spacecraft of claim 6, wherein the processing system connects an energy supply of the spacecraft to one pulsed ablative thruster at a time so that only a single pulsed ablative thruster receives input power from the energy supply at a particular time.

9. The spacecraft of claim 6, wherein the processing system continuously distributes the thrust generation resulting from activity of the pulsed ablative thrusters over multiple pulsed ablative thrusters.

10. A spacecraft of claim 1, wherein the desired attitude is generated based on an orbital position, velocity, and preplanned orbit for the spacecraft.

11. The spacecraft of claim 1, wherein the processing system selects one of the pulsed ablative thrusters for activation based at least in part on the control torque by evaluating a sign of the control torque to generate a control signal for a thruster select switch system.

12. The spacecraft of claim 11, wherein the evaluating of the sign of the control torque to generate the control signal for the thruster select switch system is performed according to if $\hat{T}_{cy} \geq 0$ and $\hat{T}_{cz} \geq 0$ then $\hat{T}_c = [0,0,1,0]^T$ if $\hat{T}_{cy} \geq 0$ and $\hat{T}_{cz} < 0$ then $\hat{T}_c = [1,0,0,0]^T$ if $\hat{T}_{cy} < 0$ and $\hat{T}_{cz} \geq 0$ then $\hat{T}_c = [0,0,0,1]^T$ if $\hat{T}_{cy} < 0$ and $\hat{T}_{cz} < 0$ then $\hat{T}_c = [0,1,0,0]^T$.

13. A method of minimizing thrust deviation from a selected path for a nanosatellite, the method comprising:
providing a spacecraft with a plurality of pulsed ablative thrusters mounted on at least one spacecraft body orientation and integrated with a frame of the spacecraft;
measuring attitude of the spacecraft using an attitude sensor;
comparing an actual attitude of the spacecraft measured from an attitude sensor on the spacecraft with a desired thrust direction;
determining a firing sequence of the plurality of pulsed ablative thrusters while continuously firing the plurality of pulsed ablative thrusters; and
controlling a thrust switch to select a single pulsed ablative thruster of the plurality of pulsed ablative thrusters according to the firing sequence.

14. A method of unified orbit and attitude control, comprising:
receiving an attitude signal from an attitude sensor at a spacecraft;
generating a desired trajectory and desired attitude signal;
calculating an attitude error signal indicative of a difference between the attitude signal from the attitude sensor and the desired attitude signal;
calculating a control torque for at least two axes using the attitude error signal; and
selecting a pulsed ablative thruster, of a plurality of pulsed ablative thrusters fixed at the spacecraft, to provide the control torque.

15. The method of claim 14, wherein generating the desired trajectory and the desired attitude signal comprises generating a desired thrust direction signal as a function of spacecraft orbital position, velocity and preplanned orbit.

16. The method of claim 14, wherein the pulsed ablative thrusters are selected for firing only one pulsed ablative thruster at a time.

17. The method of claim 14, further comprising:
providing maximum torque control by mounting the plurality of pulsed ablative thrusters on extremities of the spacecraft on at least one of the spacecraft's body orientations.

18. The method of claim 14, further comprising:
operating at least one of the pulsed ablative thrusters at any given time.

19. The method of claim 14, wherein selecting the pulsed ablative thruster of the plurality of pulsed ablative thrusters fixed at the spacecraft using the control torque comprises connecting an energy supply of the spacecraft to one pulsed ablative thruster at a time so that only a single pulsed ablative thruster receives input power from the energy supply at a particular time.

* * * * *